(No Model.)
J. A. BARRETT.
ELECTRIC CONDUCTOR.
No. 482,151. Patented Sept. 6, 1892.
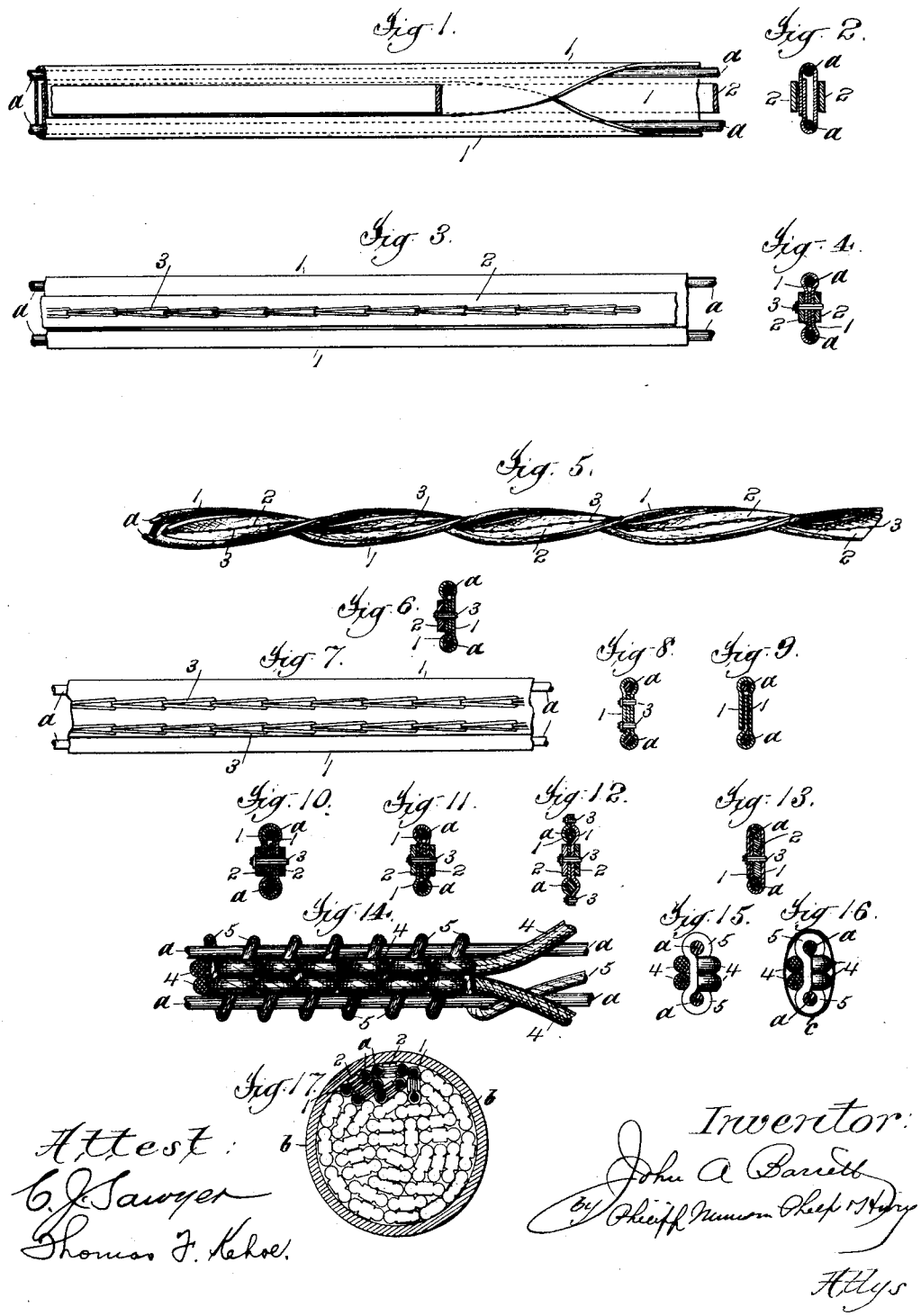

UNITED STATES PATENT OFFICE.

JOHN A. BARRETT, OF BROOKLYN, NEW YORK, ASSIGNOR TO THE STANDARD UNDERGROUND CABLE COMPANY, OF PITTSBURG, PENNSYLVANIA.

ELECTRIC CONDUCTOR.

SPECIFICATION forming part of Letters Patent No. 482,151, dated September 6, 1892.

Application filed July 17, 1891. Serial No. 399,798. (No model.)

*To all whom it may concern:*

Be it known that I, JOHN A. BARRETT, a citizen of the United States, residing at Brooklyn, county of Kings, and State of New York, have invented certain new and useful Improvements in Electric Conductors, fully described and represented in the following specification and the accompanying drawings, forming a part of the same.

This invention relates to the manufacture of insulated electric conductors, and especially to the construction of electric circuits composed of a pair of conductors forming the two branches of the circuit and electric cables composed of a number of such circuits, its object being especially to provide an improved circuit whereby a greater number of efficient circuits may be inclosed within a given space and an improved construction of electric cables be obtained, and, further, to provide a simple, cheap, and efficient construction combining in a single strand a plurality of insulated conductors.

In the construction of cables of the class referred to it has been the practice to surround each conductor with a winding of paper, cotton, tape, or other suitable insulating material, the winding, if of cotton, tape, or similar absorbent material, generally being saturated with paraffine or other suitable insulator, the conductors thus insulated being grouped together to form the cable. In some cases the conductors forming a circuit have been connected so as to form a single strand by wrapping the two previously-insulated conductors with a single covering of paper or similar material, and it has been proposed to wrap the two naked conductors in such a manner as to form a single strand with insulation between and about them.

It is well known that retardation by induction in the metallic circuits forming a cable is reduced and the efficiency of the circuits increased as the distance and amount of insulation between the conductors are increased, and it is desirable, therefore, to separate the conductors as widely as possible. In the limited cross-area of a cable, therefore, but a comparatively small number of circuits of high efficiency can be inclosed, and an increase in the number of circuits has heretofore been attended by a corresponding loss of efficiency on account of the close proximity of the conductors.

It is well known, also, that the inductive capacity tending to produce retardation is greater between the conductors forming a circuit than between conductors of different circuits. It is evident, therefore, that the number of efficient circuits within a given space may be increased or a greater efficiency of the same number of circuits be secured by subdividing the space within the cable, so as to increase the distance between the conductors of each circuit and decrease that between conductors of different circuits until the point of highest joint economy of space and efficiency is reached. In cables of the class referred to, therefore, it is desirable that the circuits shall be of such form that the greatest possible number may be packed within a given space, that the insulation shall be distributed so as to secure the greatest possible efficiency, the insulation between the conductors of the same circuit being greater than that between conductors of adjacent circuits, and that the insulation be of such a character that the amount between and outside the conductors may readily be adjusted, as desired, in making the circuits.

It is evident that circuits having an oblong or oval cross-section will pack with less loss of space than circuits of circular or other forms; but with the single-strand circuits above referred to, in which two insulated conductors laid side by side are inclosed in a single covering while an oblong circuit is produced, the insulation between conductors of different circuits is always greater than between conductors of the same circuit on account of the covering, which results in a loss of space with no gain in efficiency. With circuits having a continuous outside insulation, so that the distance between the conductors of adjacent circuits is double the thickness of the insulation outside the conductors, it is necessary, therefore, for the highest economy that the conductors of the circuit should be separated a distance more than double the thickness of the insulation about them, while with certain forms of open insulation this is not necessary.

I provide an improved circuit consisting of a single strand, the circuit being oblong or of substantially flat form in cross-section, so that a larger number of circuits may be packed in a given space than with circuits of other forms, and with the insulation between and about the conductors of the circuit so adjusted that the insulation between the conductors of the same circuit is always greater than that between conductors of adjacent circuits when the circuits are grouped to form the cable, the insulation being such that it may readily be adjusted to secure the desired distribution in making the circuit.

By my invention, also, I provide a simple, cheap, and efficient construction, combining in a single-covered strand a plurality of insulated conductors, this construction being especially applicable in insulating and covering the conductors of a circuit, so as to form my improved oblong single-strand circuit.

While my improved oblong circuit may be used with advantage in all classes of cables, including filled cables, in which the spaces about the circuits are filled with a sealing material, and this part of my invention is independent of the special class of cable or character of the insulating material applied about the conductors in forming the circuits or about the circuits in forming the cable, the specific form of insulation and method of covering conductors claimed in the present case are especially applicable to circuits to be used in what are known as "dry-core" cables, in which the conductors are covered with paper or similar non-conductive material and then grouped together within a protecting-sheath of lead or similar material to form the cables, the spaces between the covered circuits and sheath being unfilled and forming air-spaces.

In the accompanying drawings, forming a part of this specification, Figure 1 shows my improved electric circuit in one of its preferred forms during the process of covering. Fig. 2 is a cross-section of the same. Fig. 3 shows the circuit after the process of covering is completed. Fig. 4 is a cross-section of the same. Fig. 5 shows the circuit in its preferred final form. Fig. 6 is a cross-section of a circuit, showing a construction employing but one binding-strip. Figs. 7 and 8 are respectively a plan view and cross-section showing both binding-strips omitted. Fig. 9 shows a circuit similar to that of Figs. 7 and 8 with the cover secured by gumming in place of sewing. Fig. 10 shows a circuit having a two-strip wrapper with two plies about the conductors. Fig. 11 shows a circuit having a two-strip wrapper secured as in Figs. 3 and 4 with one ply about the conductors. Fig. 12 shows another method of applying a wrapper consisting of two strips. Fig. 13 shows a circuit with a binding-strip inside the wrapper. Figs. 14, 15, and 16 show a woven circuit. Fig. 14 is a plan of a partially-woven circuit. Fig. 15 is a cross-section of the same. Fig. 16 is a cross-section of a woven circuit with an envelope. Fig. 17 is a cross-section of a dry-core cable of my improved construction.

Referring now especially to Figs. 1 to 5, $a\ a$ are the electric conductors forming the two branches of the circuit.

1 is a wrapper of paper or other suitable material, consisting, in the form shown in these figures, of a single strip of sufficient width to wrap about both conductors when separated to the required distance and to overlap at the edges, preferably, to the full or approximately the full distance between the two conductors, as shown. 2 2 are strips of paper or cardboard lying upon opposite sides of the wrapper between the conductors and preferably of a width approximating the distance between the conductors, these strips being preferably of a thickness in excess of that of the paper forming the wrapper about the conductors, so that when they and the wrapper are pressed together the thickness of the circuit between the conductors will be substantially the diameter of the covered conductors. The strips 2 2 form binding-strips by which the wrapper is secured and serve to stiffen and strengthen the circuit, at the same time filling the space between the conductors.

The binding-strips 2 2 and wrapper 1 are preferably secured together by sewing, as shown in Figs. 3 and 4, a line of stitches 3 being run through the three layers of the wrapper and the strips between the conductors, so that the whole construction is thus firmly bound together into a single strand. I have shown the sewing as consisting of a single line of stitches, but it is evident that a line of stitches may be run at each edge of the binding-strips, if preferred. In place of sewing, any suitable adhesive material may be applied to the binding-strips and wrapper, and the parts thus gummed together; but sewing will generally be found preferable.

The circuit may be covered by hand or by machine and in one or more steps and the wrapper may be applied spirally or straight. I prefer, however, to employ the method illustrated, in which the wrapper 1 is laid parallel with the conductors $a$ and wrapped about them straight, as shown, the binding-strips 2 2 being applied as the overlapping edges of the wrapper are brought together, and the entire construction completed at a single operation by the addition of the stitches 3 or by gumming, as previously described. The covered circuit at the same operation may be twisted into the form shown in Fig. 5 to neutralize induction, as usual, or this form may be given to it by an independent operation when the circuits are to be grouped to form the cable. It will be seen that the circuit thus formed is oblong in cross-section and that a very large number of circuits may be packed within a given space, as shown in Fig. 16, which shows a complete dry-core cable with the circuits inclosed within the usual sheath $b$ of lead or similar material. As shown in this figure, also, the distance between conductors of the same circuit is greater than that between conductors of adjacent circuits, this relation, with a continuous insulation outside the conductors, being assured by separating the conductors of each circuit a distance more than double the thickness of the insulation outside the conductors, as shown clearly in Fig. 4.

When the circuits forming the cable are straight and the conductors of different circuits lie parallel with each other, the relative distance between conductors of the same circuit and of adjacent circuits is the same throughout the cable; but the circuits forming the cable are preferably twisted to spiral form to neutralize induction, in which case the distance between conductors of adjacent circuits varies and will be greater at some points than the distance between conductors of the same circuit. It will be understood, therefore, that throughout the specification and claims in the statement of relative distance or amounts of insulation between conductors of the same and adjacent circuits I do not mean to limit myself to a construction in which this relation is maintained throughout the cable, but intend to include all constructions in which the space within the cable is distributed so that this relation exists at the points of nearest approach of adjacent circuits.

It will be seen, also, that my invention provides a very simple and cheap insulated single-strand circuit, in which the conductors are firmly held at the distance apart at which they are placed and that this distance may readily be varied, as it depends simply upon the position in which the conductors are placed in wrapping and the size of the wrapper and binding-strips. The circuit, also, while sufficiently flexible for convenience in handling, especially in the spiral form, forms a rigid construction transversely to the conductors, by which folding of the circuit between the conductors is prevented, so that the danger of breakage and displacement of the conductors is avoided and the conductors are rigidly held at the proper distances apart.

While I prefer the construction shown, with a binding-strip on each side of the circuit, as a stronger circuit is thus produced, it is evident that other constructions may be employed. Thus I may omit one of the strips, employing only a single strip, preferably on the side of the circuit on which the ends of the wrapper are overlapped. Such a construction is shown in Fig. 6. It is evident, also, especially if the wrapper be of considerable thickness and rigidity, that a practical circuit may be formed, as shown in Figs. 7 and 8, the binding-strips being entirely omitted and the wrapper secured simply by sewing the three layers of the wrapper together between the conductors, preferably by a double row of stitches, as shown, in order that the conductors may be held more closely in the positions in which they are placed. A similar construction is shown in Fig. 9, in which the three layers of the wrapper are secured by gumming—a construction that will be found practical and satisfactory under some conditions.

It may be found preferable in some cases to apply more than one thickness of wrapper material about the conductors, and the strip forming the wrapper may consist of two or more superposed strips, as shown in Fig. 10. Greater flexibility and the covering of any slight imperfections in the material are thus secured.

The construction may be varied, also, in other respects without departing from my invention. Thus while I prefer to form the wrapper from a single strip of one or more thicknesses and apply it straight, as shown, this is not absolutely necessary; but the wrapper may be formed from any number of strips desired and may be applied spirally or in any other suitable manner. Thus in Fig. 11 I have shown a construction similar to that of Figs. 1 to 4, except that the wrapper 1 is formed of two strips, each enveloping a conductor and both ends of the two strips overlapping between the conductors, where they are secured together by the binding-strips 2 and stitching, as shown, or by gumming, as previously described.

In Fig. 12 I have shown another construction employing a two-part wrapper, in which the wrapper consists of two strips, each of greater width than the distance between the conductors, the conductors being laid longitudinally of and between the strips with the binding-strips 2 above and below the wrapper, as in the construction shown in Figs. 1 to 4, the edges of the two parts of the wrapper overlapping outside the conductors. The two parts of the wrapper are secured together outside of the conductors and the binding-strips and wrapper between the conductors, preferably by three rows of stitches, as shown, although gumming may be substituted, as previously described.

In the constructions thus far described I have shown the binding-strips as applied outside the wrapper. If preferred, however, the circuit may be formed by placing one or more strips between the conductors and then folding the wrapper about the conductors and binding-strip, the parts then being secured together, as previously described. Such a construction is shown in Fig. 13.

While the methods of covering and insulating the conductors to form the oblong circuit, which have been described, are simple and efficient and are preferable in certain classes of cables, my invention of an oblong circuit is of general application in all classes of cables, as above stated, and may be formed with insulation of other character and applied by other methods. In certain classes of cables fibrous air-containing insulation is used next the conductors, so that the conductors are insulated largely by dry air, and the circuits thus insulated may be packed within a protecting-sheath without filling to form a dry-core cable, or sealing material may be used to fill the spaces about the circuits, in which case an envelope will preferably be applied about each circuit to prevent the passage of the sealing material to the fibrous insulation, thus preserving the air insulation about the conductors. Such a filled cable is shown in my patent, No. 424,751, dated April 21, 1890.

In Figs. 14, 15, and 16 I have shown a circuit consisting of two conductors woven in a single mesh of cord to form my improved oblong circuit, the method of weaving employed consisting in laying two strands longitudinally of and between the conductors $a$ and weaving the conductors and strands together by a single strand 5, wound about the conductors and central strands and crossing alternately above and below the latter. By the use of two strands between the conductors the conductors are separated the required distance to secure the proper adjustment of insulation between the conductors of the same circuit and of different circuits when the circuits are grouped to form the cable, and a circuit of substantially the same form as already described in connection with the other constructions produced. This woven circuit is claimed as my application, Serial No. 377,086, filed January 8, 1891.

If circuits of the form shown in Figs. 14 and 15 be grouped together without envelopes, it is evident that the thickness of the insulation between the conductors of a circuit will be largely in excess of that between different circuits on account of the open form of the outside insulation. The circuits in the cable falling naturally into such positions that the outside strands of the different circuits lie between each other and the conductors of adjacent circuits are separated only the thickness of a single outside strand.

If envelopes are used, as described in my patent above referred to, it is evident that the distance between conductors of adjacent circuits will be at least double that of the thickness of the insulation about the conductors together with that of the envelope. In this case, therefore, the conductors will be woven by the adjustment of the insulation so that the conductors will be separated a distance more than double the thickness of the insulation outside them, as shown in Fig. 16, and as described in connection with the other constructions, and the insulation of conductors of the same circuit is always greater than that between conductors of adjacent circuits at their points of nearest approach when the circuits are grouped in the cable independently of the manner in which the cable is formed.

While it is desirable that the conductors when forming a circuit should be separated by a greater thickness of insulating material than that surrounding the conductors and that the circuit should be of oblong form, as above pointed out, and I have shown the conductors thus covered, it is evident that my improved construction of wrapped conductors is applicable in all cases in which a single strand combining a plurality of insulated conductors is desired at a single operation whether the conductors form a circuit or not, and whatever be the number of conductors the relative amounts of insulating material between and about the conductors or the form of the strand, and any such construction is within my invention.

While I have shown only the preferred methods of forming my improved oblong circuit it will be evident that it may be produced by many other methods and with insulation of widely-different form.

The essential feature of that part of my invention which relates to the form of the circuit consists, broadly, in the oblong form of the circuit with the insulation so adjusted that the amount of insulation between the conductors of a circuit is in excess of that between conductors of adjacent circuits when the circuits are grouped to form a cable, and this construction I intend to cover broadly, independently of the special class of cable in which the circuits are used or the character or form of insulation employed.

What I claim is—

1. In an electric cable, the combination of a plurality of independent circuits, each circuit consisting of a pair of conductors formed into a single oblong strand, the distance between conductors of the same circuit being greater than that between conductors of adjacent circuits, substantially as described.

2. In an electric cable, the combination of a plurality of independent circuits, each circuit consisting of a pair of conductors formed into a single strand by a covering of paper or other insulating material applied about both conductors and secured to hold the conductors at a distance apart greater than the distance between conductors of adjacent circuits in the cable, substantially as described.

3. In an electric cable, the combination of a plurality of independent circuits, each circuit consisting of a pair of conductors formed into a single oblong strand by a covering of paper or other insulating material applied about both conductors and secured to hold the conductors at a distance apart greater than the distance between the conductors of adjacent circuits in the cable, substantially as described.

4. An electric cable consisting of an inclosing sheath and a plurality of independent circuits, each circuit consisting of a pair of conductors formed into a single oblong strand, the distance between conductors of the same circuit being greater than that between conductors of adjacent circuits, substantially as described.

5. An electric cable consisting of an inclosing sheath and a plurality of independent circuits, each circuit consisting of a pair of conductors formed into a single oblong strand by a covering of paper or other insulating material applied about both conductors and secured to hold the conductors at a distance apart greater than the distance between the conductors of adjacent circuits in the cable, substantially as described.

6. A plurality of conductors having a covering consisting of a strip formed of one or more layers of paper or other insulating material wrapped about and inclosing all the conductors and having its opposite sides secured together between the conductors to hold them in place, substantially as described.

7. A plurality of conductors having a covering of paper or other insulating material applied about the conductors and a binding strip or strips between the conductors, the covering and binding strip or strips being secured together between the conductors to hold them in place, substantially as described.

8. A plurality of conductors having a covering of paper or other insulating material applied about the conductors and a binding strip or strips applied outside the wrapper between the conductors, the covering and binding strip or strips being secured together between the conductors to hold them in place, substantially as described.

9. A pair of conductors having a covering consisting of one or more strips of paper or other insulating material wrapped about both conductors and a binding strip or strips between the conductors, the wrapping and binding strip or strips being secured together between the conductors to hold them in place, substantially as described.

10. A pair of conductors having a covering consisting of one or more strips of paper or other insulating material applied straight and wrapped about both conductors with the edges overlapping between the conductors and having the plies secured together between the conductors to hold them in place, substantially as described.

11. A pair of conductors having a covering consisting of one or more strips of paper or other insulating material applied straight and wrapped about both conductors with the edges overlapping between the conductors and a binding strip or strips between the conductors, the wrapping and strip or strips being secured together between the conductors by sewing or gumming to hold them in place, substantially as described.

In testimony whereof I have hereunto set my hand in the presence of two subscribing witnesses.

JOHN A. BARRETT.

Witnesses:
J. W. MARSH,
C. C. WOLFE.